United States Patent
Hong et al.

(10) Patent No.: US 10,299,180 B2
(45) Date of Patent: May 21, 2019

(54) METHODS FOR CONTROLLING MOBILITY OF USER EQUIPMENT FOR PERFORMING V2X COMMUNICATION AND APPARATUSES FOR PERFORMING THE SAME

(71) Applicant: KT CORPORATION, Gyeonggi-do (KR)

(72) Inventors: Sung-pyo Hong, Seoul (KR); Woo-jin Choi, Seoul (KR)

(73) Assignee: KT CORPORATION, Gyeonggi-do (KR)

(*) Notice: Subject to any disclaimer, the term of this patent is extended or adjusted under 35 U.S.C. 154(b) by 77 days.

(21) Appl. No.: 15/411,926

(22) Filed: Jan. 20, 2017

(65) Prior Publication Data

US 2017/0215119 A1  Jul. 27, 2017

(30) Foreign Application Priority Data

Jan. 22, 2016  (KR) .................. 10-2016-0008351
Dec. 8, 2016   (KR) .................. 10-2016-0167023

(51) Int. Cl.
*H04W 36/08*  (2009.01)
*H04W 36/00*  (2009.01)
(Continued)

(52) U.S. Cl.
CPC ............ *H04W 36/08* (2013.01); *H04L 67/12* (2013.01); *H04L 67/32* (2013.01);
(Continued)

(58) Field of Classification Search
None
See application file for complete search history.

(56) References Cited

U.S. PATENT DOCUMENTS

2007/0293224 A1  12/2007  Wang et al.
2013/0023269 A1   1/2013  Wang et al.
(Continued)

FOREIGN PATENT DOCUMENTS

| KR | 10-2014-0005386 A | 1/2014 | |
| WO | 2007/149509 A2 | 12/2007 | |
| WO | WO 2015137637 A1 * | 9/2015 | ............ H04W 76/14 |

OTHER PUBLICATIONS

ZTE: "Discussion on the ProSe authorized indication in X2 handover," 3GPP Draft, R3-141809, 3rd Generation Partnership Project (3GPP), Aug. 2014, pp. 1-5.*

(Continued)

*Primary Examiner* — Donald L Mills
(74) *Attorney, Agent, or Firm* — IP Legal Services, LLC

(57) ABSTRACT

Provided are methods and apparatuses for controlling the mobility of a user equipment for performing mobile communication network-based Vehicle To Everything (V2X). For example, a handover method may be provided for a user equipment for performing Vehicle To Everything (V2X) communication. The handover method may includes receiving synchronization type information for the V2X communication from a source base station, and configuring a synchronization type, receiving, from the source base station, handover command information including resource configuration information for the V2X communication which is configured by a target base station; and performing the V2X communication until completion of a handover to the target base station by using the resource configuration information.

11 Claims, 8 Drawing Sheets

(51) Int. Cl.
    *H04W 56/00* (2009.01)
    *H04L 29/08* (2006.01)
    *H04W 36/32* (2009.01)
(52) U.S. Cl.
    CPC ... *H04W 36/0066* (2013.01); *H04W 36/0072* (2013.01); *H04W 56/001* (2013.01); *H04W 36/03* (2018.08); *H04W 36/32* (2013.01)

(56) References Cited

U.S. PATENT DOCUMENTS

| | | | |
|---|---|---|---|
| 2014/0087734 A1 | 3/2014 | Wang et al. | |
| 2015/0173011 A1* | 6/2015 | Das | H04W 16/26 370/328 |
| 2015/0215987 A1* | 7/2015 | Kim | H04W 76/04 370/329 |
| 2015/0319653 A1 | 11/2015 | Wang et al. | |
| 2016/0028585 A1* | 1/2016 | Wager | H04B 7/024 455/452.2 |
| 2016/0100374 A1* | 4/2016 | Choi | H04W 56/0015 370/331 |
| 2016/0165490 A1* | 6/2016 | Nagasaka | H04L 5/0035 370/331 |
| 2016/0277922 A1* | 9/2016 | Gunnarsson | H04W 8/26 |
| 2016/0302119 A1* | 10/2016 | Chen | H04W 56/002 |
| 2017/0019887 A1* | 1/2017 | Jiang | H04W 72/042 |

OTHER PUBLICATIONS

Samsung, "Discussion on synchronization for PC5 based V2X communication", R1-156815, 3GPP TSG RAN WG1 #83, Anaheim, USA, Nov. 15-22, 2015, pp. 1-3.

* cited by examiner

METHODS FOR CONTROLLING MOBILITY OF USER EQUIPMENT FOR PERFORMING V2X COMMUNICATION AND APPARATUSES FOR PERFORMING THE SAME

CROSS-REFERENCE TO RELATED APPLICATION

This application claims priority from Korean Patent Application Nos. 10-2016-0008351, filed on Jan. 22, 2016 and 10-2016-0167023, filed on Dec. 8, 2016, which are hereby incorporated by reference for all purposes as if fully set forth herein.

BACKGROUND OF THE INVENTION

1. Field of the Disclosure

The present disclosure relates to methods and apparatuses for controlling the mobility of a user equipment for performing mobile communication network-based Vehicle To Everything (V2X), and more particularly, to methods and apparatuses for reducing communication interruption during a handover process of a user equipment for performing V2X.

2. Description of the Prior Art

Due to advance in a communication technology, information can be exchanged between two parties at a high speed. Such advance in the communication technology have caused many changes in serices, techniques, and daily life. For example, an intelligent transportation system has been introduced, and related technologies such as a motor vehicle communication technique and an intelligent motor vehicle technique have been advanced rapidly.

Motor vehicle communication technologies have been advanced to provide various services, such as providing real-time traffic information, providing warnings for improving the safety of a motor vehicle, transmitting messages for smooth traffic flow, and archieving cooperative driving.

Vehicle To Everything communication (V2X) denotes technology for communication between a motor vehicle and all interfaces. Such V2X communication includes Vehicle To Vehicle (V2V) communication, Vehicle To Infrastructure (V2I) communication, and Vehicle To Pedestrian (V2P) communication. The V2X communication has been developed to improve driving safety, convenience, and mobility efficiency.

For better and smooth motor vehicle communication, there are many requirements, such as wireless communication resources and development of a wireless communication protocol customized to motor vehicle communication. The commercialization of motor vehicle communication has been conducted in many countries. Accordingly, interest in the motor vehicle communication has been increased.

Such motor vehicle communication needs high-speed mobility and wide availability even if a vehicle is located at outside coverage of a base station. To this end, it requires to develop technology to maintain stable communication although handover process is frequently performed. That is, it is necessary to develop technology to satisfy the requirements for motor vehicle communication even in a frequent handover processes in high-speed traveling by preventing or minimizing temporal interruption in a handover process of a user equipment.

SUMMARY

An embodiment of the present disclosure which has been devised in view of the above-mentioned background provides a method and an apparatus for stably supporting V2X communication even in high-speed travelling with mobile communication technology (e.g., Long Term Evolution (LTE) or LTE-Advanced (LTE-A)).

Also, another embodiment of the present disclosure provides a specific handover procedure for preventing or minimizing communication interruption in a handover process of a user equipment performing V2X communication.

In accordance with an aspect of the present disclosure, a handover method of a user equipment for performing Vehicle To Everything (V2X) communication is provided. The handover method may include: receiving synchronization type information for the V2X communication from a source base station, and configuring a synchronization type; receiving, from the source base station, handover command information including resource configuration information for the V2X communication which is configured by a target base station; and performing the V2X until completion of a handover to the target base station by using the resource configuration information.

In accordance with another aspect of the present disclosure, a method for controlling a handover of a user equipment for performing Vehicle To Everything (V2X) communication by a source base station is provided. The method may include; determining the handover of the user equipment that is performing the V2X communication; transmitting, to a target base station, handover preparation information including at least one piece of information among V2X configuration information configured by a source base station, Global Navigation Satellite System (GNSS) status information of the user equipment, and user equipment capability information; receiving, from the target base station, resource configuration information for the V2X communication of the user equipment; and transmitting handover command information including the resource configuration information to the user equipment.

In accordance with still another aspect of the present disclosure, an apparatus of a user equipment for performing Vehicle To Everything (V2X) communication is provided. The apparatus may include: a controller configured to receive synchronization type information for the V2X communication from a source base station, and to configure a synchronization type; and a receiver configured to receive, from the source base station, handover command information including resource configuration information for the V2X communication which is configured by a target base station, wherein the controller performs the V2X communication until completion of a handover to the target base station by using the resource configuration information.

In accordance with yet another aspect of the present disclosure, an apparatus of a source base station for controlling a handover of a user equipment for performing Vehicle To Everything (V2X) communication is provided. The apparatus may include: a controller configured to determine the handover of the user equipment that is performing the V2X communication; a transmitter configured to transmit, to a target base station, handover preparation information including at least one piece of information among V2X configuration information configured by a source base station, Global Navigation Satellite System (GNSS) status information of the user equipment, and user equipment capability information; and a receiver configured to receive, from the target base station, resource configuration information for the V2X communication of the user equipment, wherein the transmitter further transmits handover command information including the resource configuration information to the user equipment.

In accordance with at least one of the above-described embodiments smooth handover and seamless communication can be provided to V2X user equipment traveling in high speed, and user equipment can continuously and stably perform V2X communication using mobile communication technology even when the user equipment is located outside the coverage of a base station.

BRIEF DESCRIPTION OF THE DRAWINGS

The above and other objects, features and advantages of the present disclosure will be more apparent from the following detailed description taken in conjunction with the accompanying drawings, in which.

DETAILED DESCRIPTION OF THE EXEMPLARY EMBODIMENTS

Figure 1:
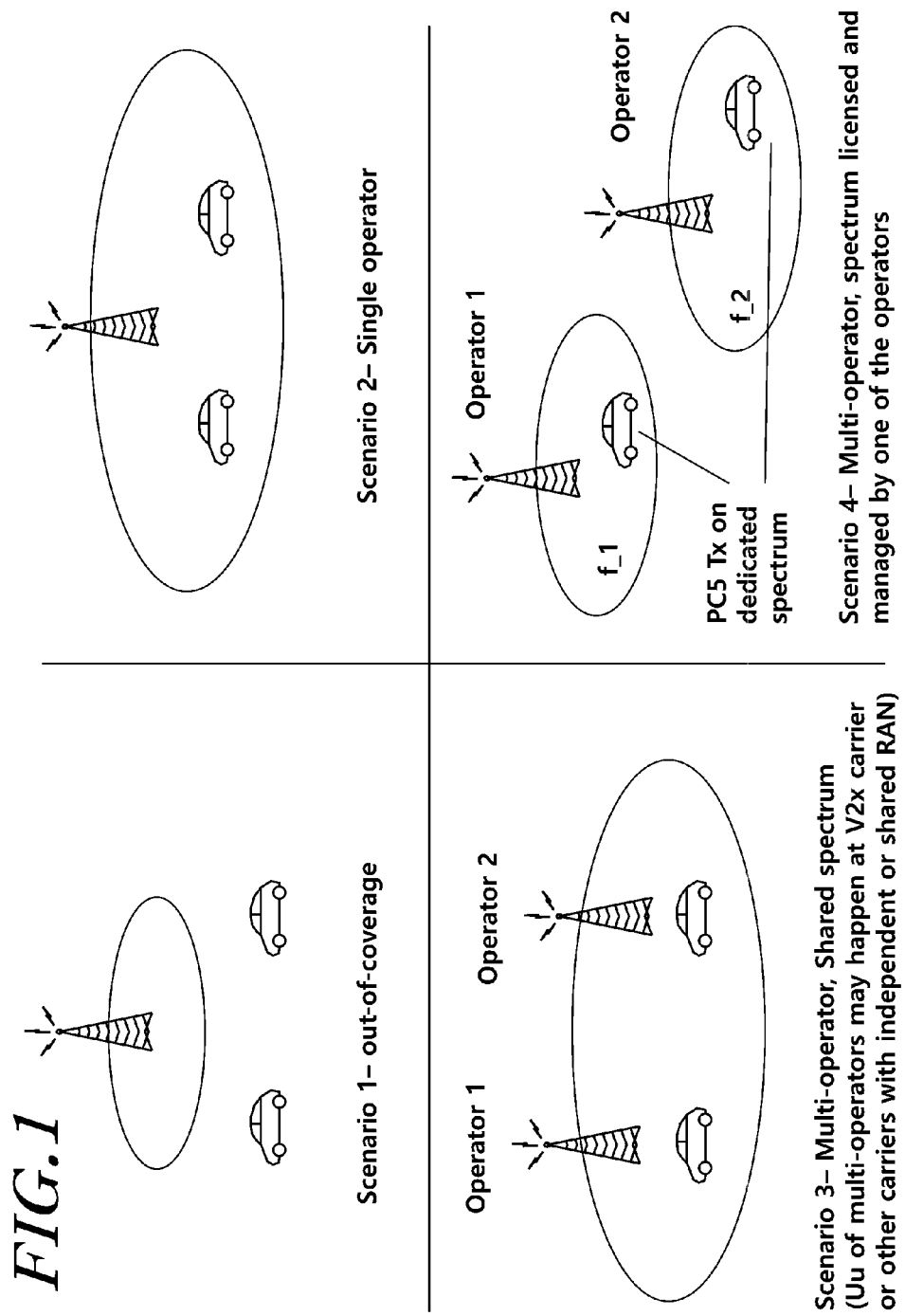
FIG. 1 is a view illustrating an example of a V2X communication scenario according to an embodiment of the present disclosure.

Hereinafter, embodiments of the present disclosure will be described in detail with reference to the accompanying drawings. It should be noted that in assigning reference numerals to elements in the drawings, the same reference numerals will designate the same elements where possible although they are shown in different drawings. Further, in the following description of the present disclosure, a detailed description of known functions and configurations incorporated herein will be omitted when it may make the subject matter of the present disclosure rather unclear.

In this specification, a Machine Type Communication (MTC) terminal may refer to a terminal supporting low cost (or low complexity), a terminal supporting coverage enhancement, or the like. In this specification, the MTC terminal may refer to a terminal supporting low cost (or low complexity) and coverage enhancement, and the like. Alternatively, in this specification, the MTC terminal may refer to a terminal defined as a predetermined category for supporting low cost (or low complexity) and/or coverage enhancement.

In other words, in this specification, the MTC terminal may refer to a newly defined Third Generation Project Partnership (3GPP) Release 13 low cost (or low complexity) UE category/type which performs Long Term Evolution (LTE)-based MTC-related operations. Alternatively, in this specification, the MTC terminal may refer to a UE category/type defined in or before the existing 3GPP Release 12 which supports the enhanced coverage in comparison with the existing LTE coverage, or supports low power consumption, or may refer to a newly defined Release 13 low cost (or low complexity) UE category/type.

In the present disclosure, the wireless communication system is widely arranged in order to provide various communication services, such as voice, packet data, and the like. The wireless communication system includes a User Equipment (UE) and a Base Station (BS) or an evolved Node-B (eNB). In this specification, the UE has a comprehensive concept implying a terminal in wireless communication. Accordingly, the UEs should be interpreted as a concept including a Mobile Station (MS), a User Terminal (UT), a Subscriber Station (SS), a wireless device, and the like in Global System for Mobile Communications (GSM) as well as User Equipments (UEs) in Wideband Code Division Multiple Access (WCDMA), Long Term Evolution (LTE), High Speed Packet Access (HSPA), and the like.

The BS or a cell usually refers to a station communicating with the UE, and may be called different terms, such as a Node-B, an eNB, a sector, a site, a Base Transceiver System (BTS), an Access Point (AP), a relay node, a Remote Radio Head (RRH), a Radio Unit (RU), a small cell, and the like.

Specifically, in this specification, the BS or the cell should be interpreted as having a comprehensive meaning indicating a partial area or a function covered by a Base Station Controller (BSC) in Code Division Multiple Access (CDMA), by a Node-B in Wideband Code Division Multiple Access (WCDMA), or by an eNB or a sector (or a site) in LTE. Accordingly, the BS or the cell has a comprehensive meaning including various coverage areas such as a megacell, a macrocell, a microcell, a picocell, a femtocell, a communication range of a relay node, that of an RRH, that of a RU, that of a small cell, and the like.

Each of the above-described various cells has a BS that controls the relevant cell, and thus, the BS may be construed in two ways. i) the BS may be a device itself that provides a megacell, a macrocell, a microcell, a picocell, a femtocell, and a small cell in association with a wireless area, or ii) the BS may indicate the wireless area itself. In i), all devices that interact with one another so as to enable the devices that provide a predetermined wireless area to be controlled by an identical entity or to cooperatively configure the wireless area, may be indicated as a BS. According to a scheme for configuring a wireless area, an eNB, an RRH, an antenna, a RU, a Low Power Node (LPN), a point, a transmission/reception point, a transmission point, a reception point, and the like may be embodiments of a BS. In ii), a wireless area itself that receives or transmits a signal from the perspective of a UE or a neighboring BS, may be indicated as a BS.

Therefore, a megacell, a macrocell, a microcell, a picocell, a femtocell, a small cell, an RRH, an antenna, a RU, an LPN, a point, an eNB, a transmission/reception point, a transmission point, and a reception point are commonly referred to as a BS.

In this specification, the UE and the BS, which are two transmission and reception subjects used to implement the art or the technical idea described in this specification, are used as a comprehensive meaning, and are not limited by a particularly designated term or word. The UE and the BS, which are two types of (uplink and downlink) transmission and reception subjects used to implement the art or the technical idea described in the present invention, are used as a comprehensive meaning, and are not limited by a particularly designated term or word. Here, the term "uplink (UL)" refers to a scheme for transmitting and receiving data by the UE with respect to the BS, and the term "downlink (DL)" refers to a scheme for transmitting and receiving data by the BS with respect to the UE.

There is no limit to multiple access schemes applied to the wireless communication system. For example, use may be made of various multiple access schemes, such as Code Division Multiple Access (CDMA), Time Division Multiple Access (TDMA), Frequency Division Multiple Access (FDMA), Orthogonal Frequency Division Multiple Access (OFDMA), OFDM (Orthogonal Frequency Division Multiplexing)-FDMA, OFDM-TDMA, and OFDM-CDMA. An embodiment of the present invention may be applied to the allocation of resources in the field of asynchronous wireless communications which have gone through GSM, WCDMA and HSPA, and evolve into LTE and LTE-advanced, and in the field of synchronous wireless communications which evolve into CDMA, CDMA-2000 and Ultra Mobile Broadband (UMB). The present invention should not be interpreted as being limited to or restricted by a particular wireless communication field, but should be interpreted as including all technical fields to which the spirit of the present invention can be applied.

Use may be made of a Time Division Duplex (TDD) scheme in which UL transmission and DL transmission are performed at different times. Alternatively, use may be made of a Frequency Division Duplex (FDD) scheme in which UL transmission and DL transmission are performed at different frequencies.

Also, in a system such as LTE or LTE-Advanced (LTE-A), a specification is established by configuring UL and DL based on one component carrier or one component carrier pair. In UL and DL, control information is transmitted through a control channel, such as a Physical Downlink Control CHannel (PDCCH), a Physical Control Format Indicator CHannel (PCFICH), a Physical Hybrid ARQ Indicator CHannel (PHICH), a Physical Uplink Control CHannel (PUCCH), an Enhanced Physical Downlink Control Channel (EPDCCH), and the like. Also, a data channel, such as a Physical Downlink Shared CHannel (PDSCH), a Physical Uplink Shared CHannel (PUSCH), and the like, is configured, and then is used to transmit data.

Meanwhile, control information may be transmitted by using an Enhanced PDCCH or Extended PDCCH (EPDCCH).

In this specification, a cell may refer to the coverage of a signal transmitted from a transmission/reception point, a component carrier having the coverage of the signal transmitted from the transmission/reception point (transmission point or transmission/reception point), or the transmission/reception point itself.

A wireless communication system, to which embodiments of the present invention are applied, may be a Coordinated Multi-Point transmission/reception (CoMP) system in which two or more transmission/reception points cooperatively transmit a signal, a coordinated multi-antenna transmission system, or a coordinated multi-cell communication system. A CoMP system may include at least two multi-transmission/reception points and UEs.

The multi-transmission/reception point may be at least one RRH that is connected to the BS or a macrocell (hereinafter referred to as an "eNB") through an optical cable or an optical fiber and is controlled by wire; and has high transmission power or has low transmission power in an area of the macrocell.

Hereinafter, a DL refers to communication or a communication path from a multi-transmission/reception point to a UE, and a UL refers to communication or a communication path from a UE to a multi-transmission/reception point. In a DL, a transmitter may be a part of a multi-transmission/reception point and a receiver may be a part of a UE. In a UL, a transmitter may be a part of a UE and a receiver may be a part of a multi-transmission/reception point.

Hereinafter, a situation in which a signal is transmitted and received through a channel, such as a PUCCH, a PUSCH, a PDCCH, an EPDCCH, a PDSCH, and the like, may be expressed as "transmitting or receiving a PUCCH, a PUSCH, a PDCCH, an EPDCCH, and a PDSCH."

Also, hereinafter, the description "transmission or reception of a PDCCH" or "transmission or reception of a signal through a PDCCH" may be used in the sense of including the transmission or reception of a EPDCCH or the transmission or reception of a signal through a EPDCCH.

Specifically, a physical downlink control channel described below may signify a PDCCH or an EPDCCH, and may also be used in the sense of including both a PDCCH and an EPDCCH.

Further, an EPDCCH, which corresponds to an embodiment of the present invention, may be applied even to a part in which a physical downlink control channel is described as a PDCCH for convenience of description, and an EPDCCH may also be applied to a part, in which a physical downlink control channel is described as an EPDCCH, as an embodiment of the present invention.

Meanwhile, higher layer signaling described below includes Radio Resource Control (RRC) signaling through which RRC information including an RRC parameter is transmitted.

An eNB performs downlink transmission to UEs. The eNB may transmit a PDSCH which is a primary physical channel for unicast transmission, and may transmit a PDCCH for transmitting DL control information, such as scheduling and the like required to receive a PDSCH, and scheduling grant information for transmitting a UL data channel (e.g., a PUSCH). Hereinafter, the transmission and reception of a signal through each channel will be described as transmission and reception of a relevant channel.

An apparatus and a method provided by an embodiment of the present disclosure may be applied to various communication systems, such as an LTE mobile communication system, an LTE-A mobile communication system, a High Speed Downlink Packet Access (HSDPA) mobile communication system, a High Speed Uplink Packet Access (HSUPA) mobile communication system, a High Rate Packet Data (HRPD) mobile communication system of the 3GPP2, a Wideband Code Division Multiple Access (WCDMA) mobile communication system of the 3GPP2, a Code Division Multiple Access (CDMA) mobile communication system of the 3GPP2, an Institute of an Electrical and Electronics Engineer (IEEE) 802.16m communication system, an Evolved Packet System (EPS), a Mobile Internet Protocol (Mobile IP) system, and the like.

Although the following description is made on the premise of a V2X communication system, the following description is only for convenience of description. Accordingly, the contents and the right scope of this specification are not limited to the V2X communication system, but can be typically applied to even a field in which inter-UE communication technology in a high-speed movement situation of a UE is required. Also, although multiple embodiments described in this specification are separately described, when the embodiments do not explicitly contradict, or collide with, each other, the multiple embodiments may be integrally practiced. Further, the UE described below is an Internet of Things or an object capable of supporting V2X communication, and may be, for example, a communication device within a motor vehicle, a smart phone, and the like. In this specification, an object that supports V2X communication will be expressed and described as a "UE," a "V2X device," or a "motor vehicle."

Meanwhile, in this specification, the V2X communication is described in the sense of including inter-UE communication which is directly performed between UEs without going through a BS by using mobile communication radio resources, vehicle-to-vehicle communication, sidelink communication, and the like, and is not limited to the relevant name. Accordingly, hereinafter, sidelink communication, V2X communication, and inter-UE communication are interchangeably used as the need arises.

FIG. 1 illustrates examplary scenarios of a V2X communication according to an embodiment. For example, FIG. 1 shows respective scenarios as follows.

Scenario 1: a UE is located out of coverage of a V2X carrier. Hereinafter, the V2X carrier is referred to one of a V2X dedicated carrier, a particular V2X carrier, a V2X direct communication carrier, and V2X carriers. for convenience of description.

Scenario 2: a V2X carrier is permitted by a single operator. A UE is located in coverage of a single operator for V2X communication.

Scenario 3: multiple operators share V2X carrier. A UE is located within coverage of an operator for V2X communication.

Scenario 4: a V2X message is transmitted at a dedicated licensed frequency managed by each operator and a V2X message is received at all the frequencies.

Since the UE is located outside coverage in the scenario 1 the UE may autonomously select resources (e.g., automonous resource selection) from previously configured resources. Since the UE is located inside coverage in the scenario 2, the UE may perform scheduled resource allocation or autonomous resource selection according to a configuration of a BS.

Figure 2:
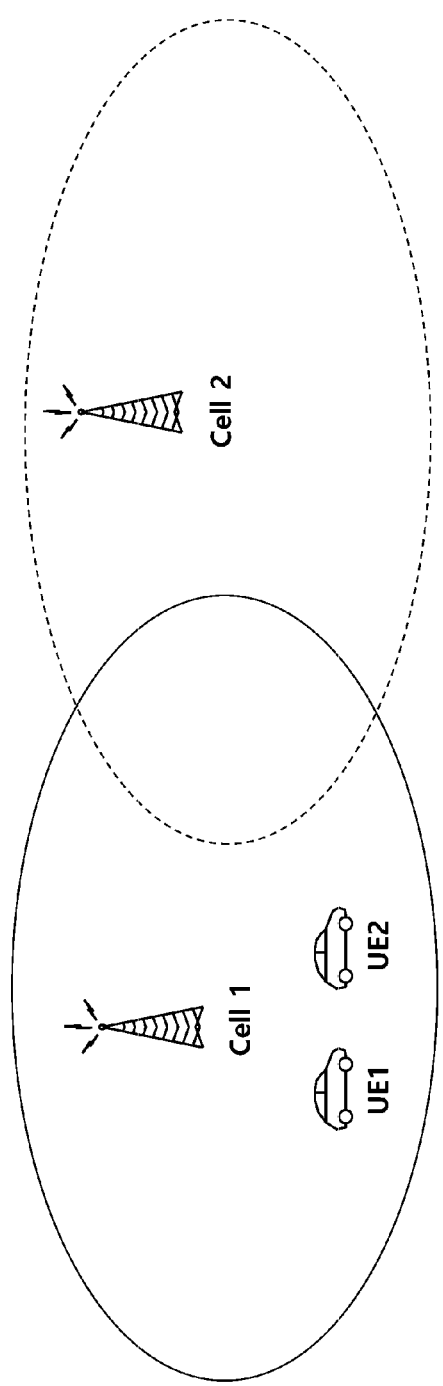
FIG. 2 is a view illustrating another example of a V2X communication scenario according to an embodiment of the present disclosure.

FIG. 2 illustrates another examplary V2X communication scenario according to an embodiment. In FIG. 2, Cell 1 represents a cell which uses another carrier which is not a V2X carrier. Cell 2 represents a cell which uses a V2X carrier.

Figure 3:
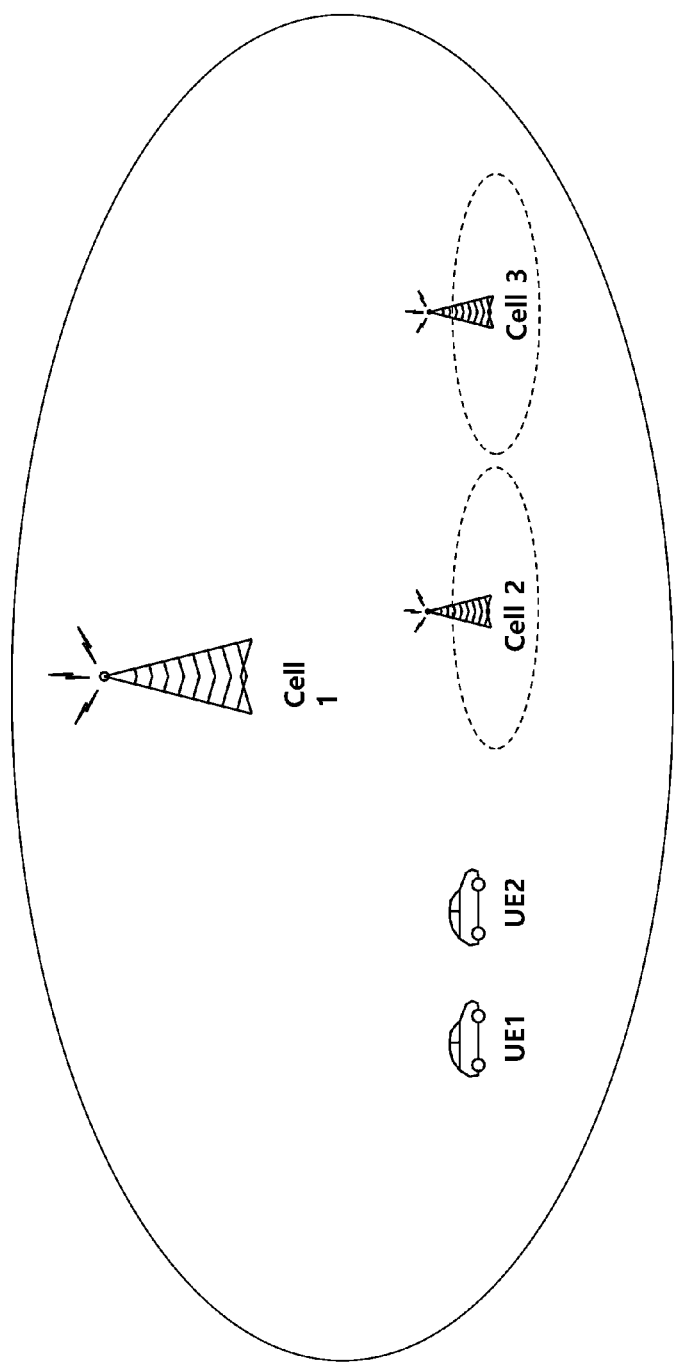
FIG. 3 is a view illustrating still another example of a V2X communication scenario according to an embodiment of the present disclosure.

FIG. 3 illustrates still another examplary V2X communication scenario according to an embodiment. In FIG. 3, a macrocell/macrocell BS/macrocell BS cell (Cell 1) uses another carrier that is not a V2X carrier, and small cells (cells 2 and 3) use a V2X carrier.

In the scenarios in FIG. 1 to FIG. 3, the UE performs V2X communication by using a V2X carrier. To this end, it requires to allocate radio resources including the V2X carrier to the UE. That is, V2X communication using mobile communication technology uses limited radio resources. Accordingly, it needs allocation of sidelink resources for the V2X communication.

Hereinafter, sidelink resource allocation will be briefly described.

Sidelink Resource Allocation

A UE that supports sidelink communication may operate in two modes in order to allocate resources. For example, the UE may operate in a scheduled resource allocation mode or in an autonomously-selected resource allocation mode.

Scheduled resource allocation has the following characteristics.

The UE needs to be in an RRC_CONNECTED state in order to transmit data.

The UE sends, to the BS, a request for transmission resources. The BS schedules transmission resources for transmitting sidelink control information and data.

The UE transmits, to the BS, a scheduling request (i.e., DL-scheduling request or random access) generated by a sidelink Buffer Status Report (BSR). Based on the sidelink BSR, the BS may confirm that the UE has data for sidelink communication, and may estimate resources required to transmit the relevant data. The BS may schedule transmission resources for the sidelink communication by using a configured Radio Network Temporary Identifier (RNTI).

Autonomous resource selection of the UE has the following characteristics.

The UE selects, by itself, particular resources from among resource pools. Also, the UE may select a transmission format for transmitting sidelink control information and data.

There may be up to eight transmission pools which are previously configured for an out-of-coverage operation or which are provided by RRC signaling for an in-coverage operation. Each pool may have one or more ProSe Per-Packet Priorities (PPPPs) associated with each pool.

When the resource pool has been selected, the selection of the relevant resource pool is valid for a Sidelink Control (SC) cycle. After the SC cycle is completed, the UE may reselect resources from among resource pools.

When the RRC-CONNECTED UE is interested in sidelink communication, the RRC-CONNECTED UE transmits a sidelink UE information message to the BS. In response to the transmitted sidelink UE information message, the BS may configure a sidelink RNTI for the UE.

Whenever the UE detects a cell on a public disaster Proximity-Based Service (ProSe) carrier, the UE is considered to be located in coverage for ProSe direct communication. The following rules are applied to the UE.

When the UE is located out of the coverage, the UE may use only autonomous resource selection.

When the UE is located in coverage for sidelink communication, the UE may use scheduled resource allocation or autonomous resource selection according to a configuration of the BS. For example, a lower layer is configured to transmit sidelink control information and corresponding data by using the indicated resources within resource pools.

In a case where the UE is located in the coverage, if this case is not an exceptional case (e.g., an exceptional case described in a 3GPP TS 36.331 document) specified by RRC, the UE needs to use only a resource allocation mode indicated by the configuration of the BS.

Although the UE is configured to use the scheduled resource allocation, when an exceptional case such as a radio link failure occurs, the UE may be allowed to temporarily use UE-autonomous resource selection. A resource pool to be used in this exceptional case may be provided by the BS.

A UE that camps on or accesses one carrier frequency but is interested in ProSe direct communication at another carrier frequency needs to attempt to discover a cell on a public disaster ProSe carrier (for convenience of description, hereinafter, expressed as a "ProSe carrier").

An RRC_IDLE UE that camps on another carrier frequency but is located in a coverage area of an E-U IRA cell on a ProSe carrier may consider the ProSe carrier to have the highest priority. Also, the RRC_IDLE UE reselects the ProSe carrier.

An RRC_CONNECTED UE that is served by a cell on another carrier frequency may transmit ProSe direct communication indication information to a serving cell when desiring to perform ProSe direct communication. The ProSe direct communication indication information includes information on a desired ProSe carrier.

The serving cell directs the UE to allow the transmission of a ProSe UE information message through the existence of a System Information Block 18 (SIB 18).

The serving cell may configure inter-frequency Radio Resource Management (RRM) measurement on the ProSe carrier.

When the UE enters the coverage of a cell on the ProSe carrier, the BS performs inter-frequency mobility through the ProSe carrier on the basis of a measurement report.

When the inter-frequency mobility is not performed by the serving cell, the UE may perform sidelink communication by using UE-autonomous resource selection from a resource pool broadcasted by an E-U IRA cell detected on the ProSe carrier.

When the UE does not detect the E-U IRA cell on the ProSe carrier, the UE may use public disaster ProSe resources previously configured for a Universal Integrated Circuit Cards (UICC) or a Mobile Equipment (ME) for out-of-coverage ProSe direct communication.

When the UE detects the E-U IRA cell on the ProSe carrier, the UE stops the use of resources previously configured for the UICC or the ME. The UE may perform sidelink communication by using UE-autonomous resource selection from a resource pool broadcasted by the E-UTRA cell detected on the ProSe carrier.

Hereinafter, V2X communication will be described as an example of the sidelink communication.

V2X

A motor vehicle may be able to be connected to the Internet and another motor vehicle by providing the motor vehicle with access to a mobile communication network (e.g., LTE or LTE-A). V2X includes three types below.

Vehicle To Vehicle (V2V) communication
Vehicle To Infrastructure (V2I) communication
Vehicle To Pedestrian (V2P) communication In 3GPP Release 12, according to the standardization of a Device to Device (D2D) technique, a basic environment has been established for enabling V2X communication to operate on the basis of LTE communication technology. However, V2X communication can be used in various ways (e.g., use cases). Accordingly, V2X communication may have many requirements. Furthermore, LTE-based V2X communication may be developed in various scenarios. Accordingly, when V2X communication is applied by using the typical LTE technology, problems may occur in detailed parts.

As an example, in the typical LTE technology, sidelink communication/discovery/synchronization resource configuration is applied to a frequency received or acquired in association with the sidelink communication/discovery/synchronization resource configuration. Moreover, with respect to a UE associated with one or more Secondary Cells (SCells), sidelink communication/discovery/synchronization resource configuration by dedicated signaling is applied to a Primary Cell (PCell) or a primary frequency.

When an RRC-CONNECTED UE that performs direct communication through a ProSe carrier moves in a relevant cell, the UE performs a handover. When the UE that performs the direct communication has been instructed to use the scheduled resource allocation, the direct communication may be stopped/delayed until the UE completes the handover.

A V2X service may be applied to more UEs having higher mobility than UEs associated with a ProSe service. A large number of UEs that desire to use a V2X carrier may be located in a particular area, and a hidden node problem caused by mobility may more seriously occur. Accordingly, in the case of the V2X service UE, it is preferable to perform communication through scheduled (e.g., dynamic or Semi-Persistent Scheduling (SPS)) resource allocation rather than through autonomous resource allocation, but it may be difficult to perform V2X transmission in response to a delay limit value required for the V2X service according to the movement of the UE. As an example, the V2X service UE is problematic because it is difficult to satisfy a pre-crash sensing wanting service which has a strict delay requirement of about 20 ms.

As described above, when the RRC-CONNECTED UE desires to perform direct communication for a V2X service, if the RRC-CONNECTED UE performs a handover according to a typical LTE handover procedure, the direct communication for the V2X service is delayed/stopped.

An objective of an embodiment of the present disclosure which has been devised to solve the above-mentioned problems is to provide a method and an apparatus for controlling a handover of a UE in LTE-based efficient V2X communication conditions.

Figure 4:
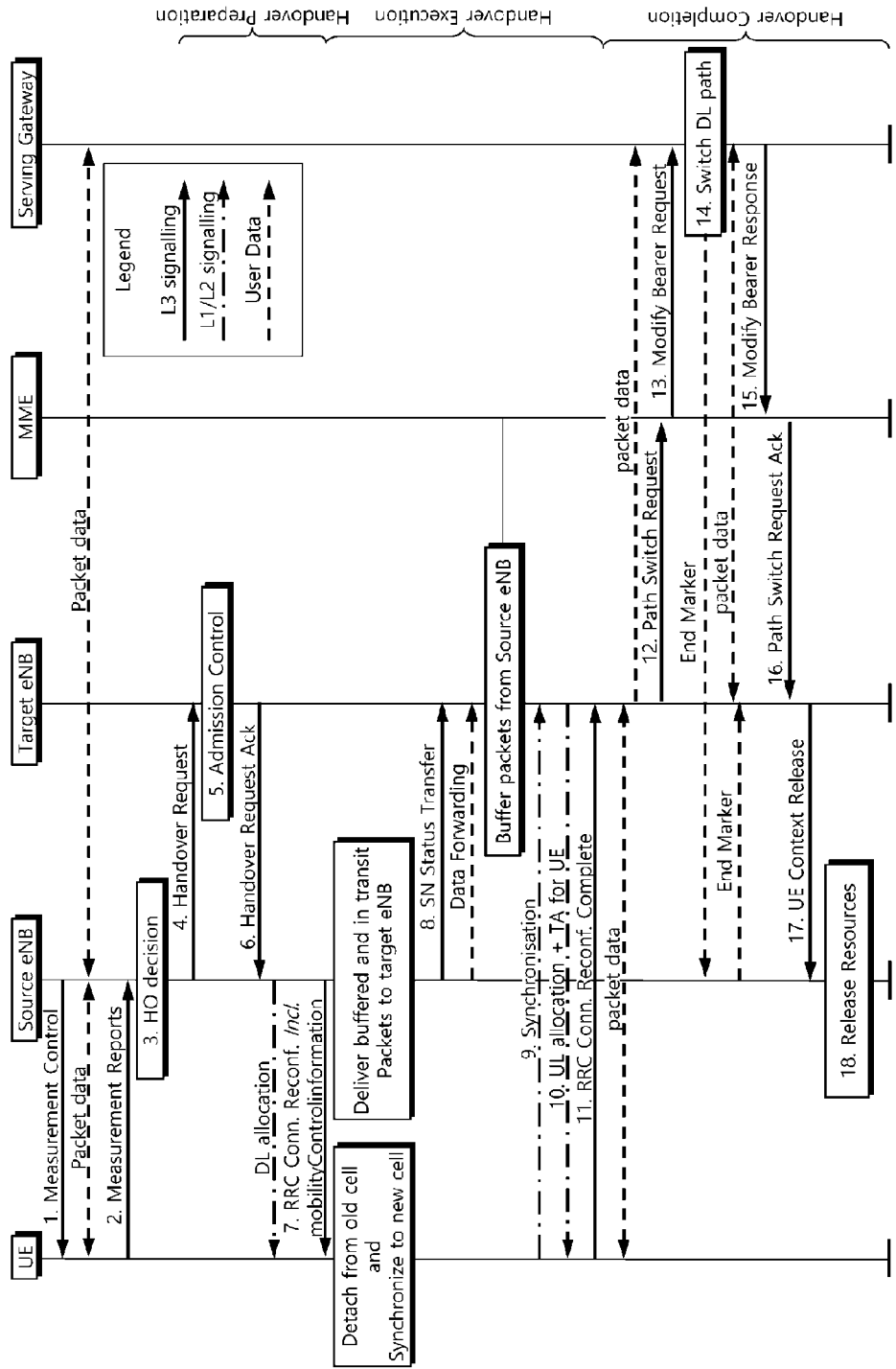
FIG. 4 is a signal flow diagram illustrating an example of an E-UTRAN handover procedure.

FIG. 4 is a signal flow diagram illustrating an example of an Evolved Universal Terrestrial Radio Access Network (E-UTRAN) handover procedure.

Referring to FIG. 4, for a handover procedure of a UE, the UE measures cell quality by using measurement configuration information of a source BS, and the UE transmits, to the source BS, a measurement report including a result of the measurement. The source BS determines a handover of the UE by using the received measurement report.

In a handover preparation procedure, when the handover of the UE has been determined, the source BS sends a request for a handover to a target BS, receives a handover request confirmation signal of the target BS, and transmits, to the UE, an RRC connection reconfiguration message including mobility control information.

Through this configuration, the UE starts and enters the handover procedure. The UE delivers data to the target BS through the source BS. The UE accesses the target BS of the handover, is synchronized with the target BS, and establishes a connection for communication. When the connection with the target BS has been established, the UE delivers packet data to the target BS and communicates with the target BS.

In a handover completion procedure, the UE releases the source BS and switches a data packet path to the target BS, through a path switch procedure between the target BS and the source BS and a core network entity.

Since a more specific handover procedure is described in detail in a 3GPP TS 36.300 document, a description of a part which makes the features of the present disclosure unclear will be omitted.

Figure 5:
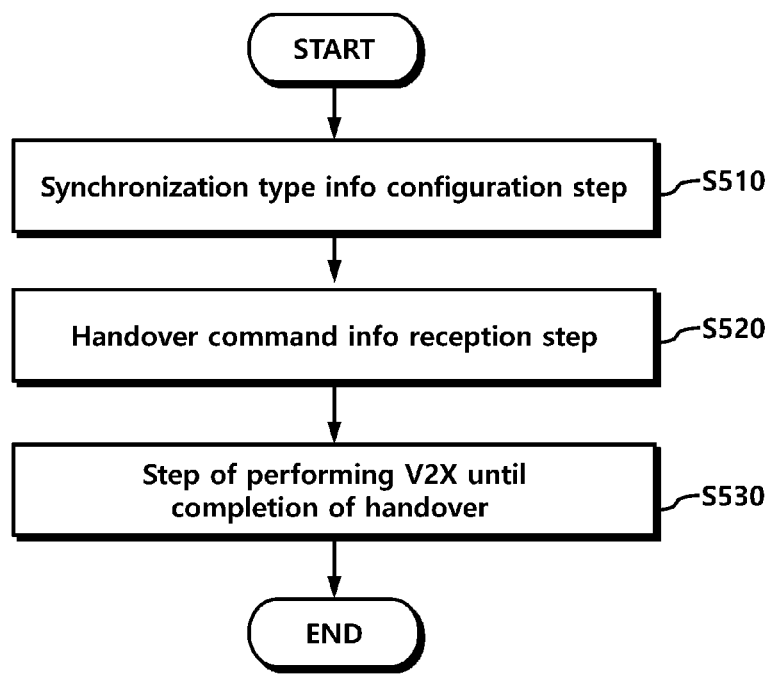
FIG. 5 is a flowchart illustrating an operation of a user equipment according to an embodiment of the present disclosure.

FIG. 5 is a flowchart illustrating an operation of a user equipment according to an embodiment of the present disclosure.

Referring to FIG. 5, the UE performs receiving, from a source BS, and configuring synchronization type information for V2X at step S510.

For example, for V2X communication, the UE needs to confirm a synchronization type for V2X and needs to configure the synchronization type for the UE. To this end, the UE may receive synchronization type information for V2X from a BS (e.g., a source BS). Then, the UE may configure the received synchronization type information in the UE and may perform V2X by using the synchronization type information. The synchronization type information may indicate whether the UE is to use BS synchronization or Global Navigation Satellite System (GNSS)-based synchronization when performing V2X. Alternatively, the synchronization type information may include priority information on the BS-based synchronization and the GNSS-based synchronization. The synchronization type information will be again described in detail below.

Meanwhile, for V2X, the UE may receive measurement configuration information, which is used for the measurement of cell quality and the like, from the BS (i.e., a source BS in a handover procedure) that is configuring an RRC connection. The measurement configuration information may include a result of measuring the quality of a neighboring cell of the UE and a result of measuring the quality of a cell that the UE is currently accessing. The UE measures channel qualities of multiple cells by using parameters included in the measurement configuration information, and transmits, to the source BS, a measurement report including a result of the measurement. The source BS may confirm the measurement report and may determine a handover of the UE.

Then, the UE performs receiving, from the source BS, handover command information including resource configuration information for V2X which is configured by a target BS at step S520.

The source BS may determine whether the handover of the UE is to be performed, on the basis of the measurement report that the UE has transmitted and RRM information of the source BS. When the handover of the UE has been determined, the UE receives handover command information from the source BS. For example, the handover command information may be delivered through an RRC connection reconfiguration message, and the handover command information may be included in mobility control information.

Meanwhile, for V2X communication, the UE needs to prevent the delay and interruption of data in a handover process. To this end, the source BS may include the resource configuration information for V2X, which is configured by the target BS, in the handover command information. Then, the source BS may transmit the handover command information including resource configuration information to the UE. That is, in order to solve a problem such as the V2X interruption or the V2X delay in the handover preparation procedure described with reference to FIG. 4, the source BS may acquire, from the target BS, information related to V2X radio resources that the UE is to use in the handover process, and the source BS may deliver the acquired information to the UE. Also, the resource configuration information may be configured on the basis of handover preparation information that the source BS transmits to the target BS, and the handover preparation information may include at least one piece of information among V2X configuration information configured by the source BS, GNSS status information of the UE, and UE capability information thereof. The target BS may configure the above-described resource configuration information by using the handover preparation information received from the source BS. For example, the V2X configuration information included in the handover preparation information may include synchronization type information that the source BS has configured in the UE. The synchronization type information may signify information for distinguishing whether the UE is using BS synchronization in performing V2X from whether the UE is using GNSS synchronization in performing V2X.

Then, the UE performs V2X communication until the completion of the handover to the target BS by using the resource configuration information at step S530.

For example, the UE may perform V2X communication by using the resource configuration information acquired through the handover command information during a handover operation. The resource configuration information may include at least one piece of information among information on radio resources for V2X and synchronization configuration information. For example, synchronization for V2X may be established by using synchronization configuration information including information on whether the UE is to use BS synchronization or GNSS synchronization or information on the priority of a BS and a GNSS. Also, in relation to radio resources for V2X, the resource configuration information may include radio resource pool information for V2X, information indicating a radio resource allocation method (e.g., scheduling performed by the BS or autonomous resource selection), and the like, and the UE may confirm the relevant resource configuration information, may configure V2X radio resources which are to be used until the completion of the handover process, and may perform V2X communication by using the configured V2X radio resources as the need arises.

As described above, the source BS includes the resource configuration information for V2X in the handover command information and transmits, to the UE, the handover command information including the resource configuration information, so that the UE can prevent the interruption and delay of V2X by using the relevant resource configuration information even before the completion of the handover.

Figure 6:
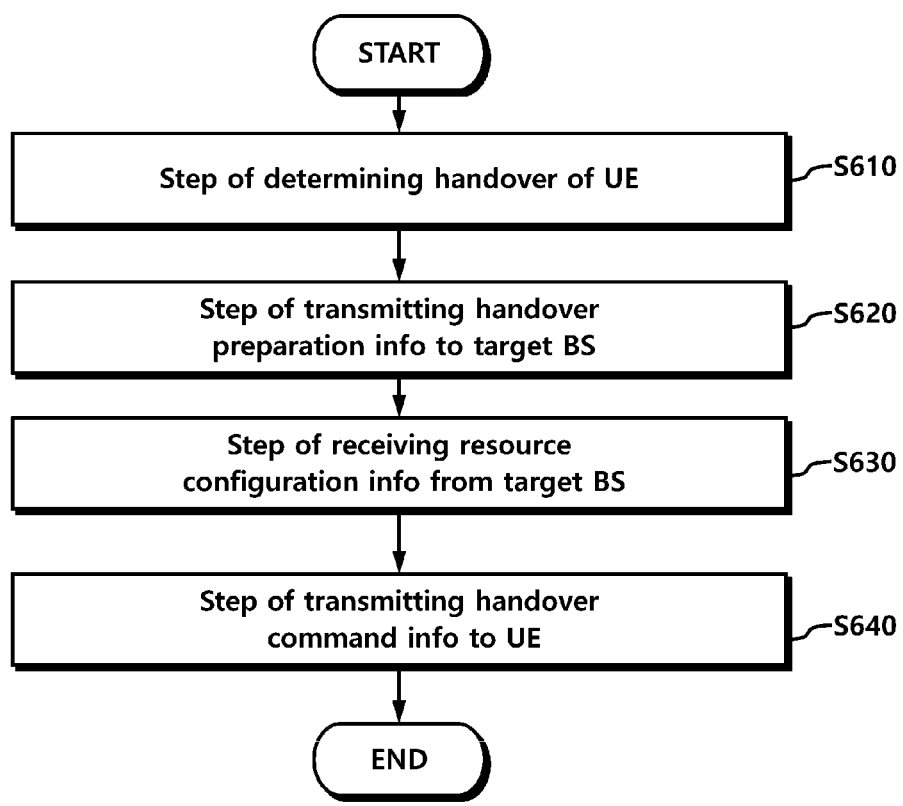
FIG. 6 is a flowchart illustrating an operation of a source base station according to an embodiment of the present disclosure.

FIG. 6 is a flowchart illustrating an operation of a source base station according to an embodiment.

Referring to FIG. 6, the source BS may determine a handover of a UE performing V2X communication in order to control the handover of the UE at step S610. For example, the source BS may determine whether a handover of the UE is to be performed, by using at least one piece of information among a measurement report received from the UE and RRM information of the source BS. Here, the UE may denote a UE performing V2X communication, and the source BS may denote a BS that configures an RRC connection with the UE. The source BS may provide a PCell to the UE. Before determining the handover of the UE, the source BS may determine and configure synchronization type information for V2X communication in the UE for the execution of V2X communication by the UE.

At step S620, the source BS may transmit, to a target BS, handover preparation information including at least one piece of information among V2X configuration information configured by the source BS, GNSS status information of the UE, and UE capability information thereof. The source BS may transmit, to the target BS, at least one piece of information among V2X-related configuration information that the source BS has configured in the UE, GNSS status information of the UE, and capability information of the UE. The information transmitted to the target BS may be included in a handover request message.

For example, the V2X configuration information may include synchronization type information configured in the UE. The synchronization type information may include information which distinguishes between and indicates whether the relevant UE is in a type which uses BS-based synchronization and whether the relevant UE is in a type which uses GNSS-based synchronization. That is, V2X configuration information includes information which indicates synchronization of a type that the UE configures or uses. The handover preparation information may be included in an AS-config field of the handover request message.

When the source BS receives, from the UE, and knows information related to a GNSS reception status of the UE, the GNSS status information may be included in the handover preparation information and may be delivered to the target BS. Meanwhile, for example, the UE capability information may include information on the capability of the UE which is related to whether the UE is capable of using a GNSS-based synchronization source, a synchronization configuration that the UE is capable of supporting, and the like.

At step S630, the source BS may receive, from the target BS, resource configuration information for V2X of the UE. The target BS generates and transmits, to the source BS, resource configuration information that the UE is capable of using before completing the handover, by using the handover preparation information received from the source BS. The resource configuration information is configured by the target BS, and the resource configuration information is used to prevent the delay and interruption of the transmission/reception of data which may occur during a process in which the UE is handed over.

As an example, the resource configuration information may include information indicating V2X radio resources that the UE is to use until the completion of the handover of the UE. As another example, the resource configuration information may include synchronization configuration information that the UE is to configure until the completion of the handover of the UE. As still another example, the resource configuration information may include both information indicating radio resources and synchronization configuration information.

At step S640, the source BS may transmit handover command information including the resource configuration information to the UE. The source BS may include the resource configuration information, which has been received from the target BS, in the handover command information, and the source BS may transmit, to the UE, the handover command information including the resource configuration information. The handover command information may be delivered to the UE in a state of being included in an RRC connection reconfiguration message, and the UE receives the handover command information and performs a preparation procedure for the handover.

The UE may maintain V2X communication on the basis of the resource configuration information until the handover is completed, before establishing synchronization with the target BS, or until transmitting/receiving data through the target BS.

Through this configuration, the UE can prevent V2X delay or V2X interruption which may occur in the handover process, and the UE can ensure requirements, such as low delay and high reliability, required for V2X.

Hereinafter, referring to FIG. 5 and FIG. 6, the above-described operations of the UE and the BSs will be described in more detail. Furthermore, pieces of information included in the handover preparation information and the handover command information will be described in more detail. Also, for convenience of description, hereinafter, the above-described V2X communication may be expressed and described as a V2X operation, sidelink direct communication, and the like as the need arises.

The source BS determines a handover of the UE on the basis of a measurement report and RRM information as in step 3 of FIG. 4. Before step 3, the UE may perform V2X communication. Alternatively, at this time, as an example, the UE may perform direct communication on the basis of source BS synchronization. As another example, the UE may perform direct communication on the basis of GNSS (or a GNSS-equivalent synchronization source, Global Positioning System (GPS), Global Orbiting Navigation Satellite System (GLONASS), BeiDou Navigation Satellite System (BDS), GALILEO, etc., and for convenience of description, hereinafter, expressed as "GNSS") synchronization. To this end, the BS may transmit, to the UE, synchronization type information for indicating a synchronization type. The UE may perform V2X by using the synchronization type information which has been received from the BS for the purpose of indication.

The BS may direct the UE to configure synchronization for PC5-based V2X among BS-based synchronization and GNSS synchronization. For example, when the UE is located within a carrier which operates in sidelink-based V2X, the BS may indicate a priority to the UE so as to enable the UE to select one of the BS-based synchronization and the GNSS synchronization. As another example, the BS may cause the UE to perform a V2X operation (e.g., V2X) on the basis of the GNSS synchronization. As still another example, when the UE is connected to a cell, which is not a V2X carrier, as a serving cell (PCell) and performs a V2X operation by using a V2X-dedicated carrier (when a PC5 carrier differs from a Uu carrier), the BS may cause the UE to perform a V2X operation on the basis of GNSS synchronization timing.

The source BS may transmit a handover request message to the target BS. The handover request message may include ProSe authentication information. Alternatively, the handover request message may include V2X authentication information. The V2X authentication information represents information configured such that the UE indicates whether a ProSe-based V2X service has been authenticated. The V2X authentication information represents information that the BS receives from a core network in a Non-Access Stratum (NAS) signaling process.

The handover request message may include a handover preparation information message.

Handover preparation information may include one or more pieces of information among the following pieces of information. That is, the handover preparation information may include at least one piece of information among V2X configuration information including V2X synchronization configuration information, GNSS status information, and GNSS-related UE Capability. Hereinafter, the respective pieces of information which may be included in the handover preparation information will be described in detail.

V2X Synchronization Configuration Information

The above-described handover preparation information may include source V2X configuration information, and the source V2X configuration information may include V2X synchronization configuration information that the source BS together with a motor vehicle configures.

The handover preparation information may include AS-config information. The AS-config included in the handover preparation information may include source V2X configuration information. The AS-config included in the handover preparation information may include source V2X discovery configuration information.

The AS-config included in the handover preparation information may include source V2X synchronization configuration information. For example, when the source BS configures BS-based synchronization and GNSS synchronization so as to include information which directs the UE to configure synchronization for PC5-based V2X, the source BS may deliver the configured BS-based synchronization and GNSS synchronization to the target BS.

In the typical LTE technology, UEs located in coverage may acquire synchronization by using a synchronization signal transmitted by the BS. Accordingly, the UEs located in the coverage may perform a sidelink operation therebetween on the basis of BS synchronization. In order to support an out-of-coverage sidelink operation or a sidelink operation between UEs located in different cells in an asynchronous network, synchronization is performed through a Sidelink Broadcast Control Channel (SBCCH) that provides a sidelink synchronization signal and system- and synchronization-related information. Accordingly, in order to perform synchronization for an out-of-coverage sidelink operation, the UE may serve as a synchronization source that transmits an SBCCH and a synchronization signal.

Synchronization configuration information included in system information 18 (System Information Block 18 (SIB18)) includes the following information.

In the typical LTE technology, sidelink synchronization configuration information (SL-SyncConfig) does not need to deliver, to a target cell, information including configuration information (rxParamsNCell) related to the reception of a synchronization signal from a neighboring cell and configuration information (e.g., a SideLink Sync Signal IDentifier (SLSSID) for identifying a cell, a transmission parameter (txParameters), etc.) on the transmission of a synchronization signal for sidelink communication and sidelink discovery. However, when the UE performs a V2X operation by using GNSS synchronization configuration information, the target BS may indicate synchronization configuration information of the UE, that has been handed over, by using the GNSS synchronization configuration information. After the handover, the target BS may need the GNSS synchronization configuration information in order to minimize the interruption of a V2X service or to indicate GNSS-based synchronization configuration.

The target BS may direct the UE to perform a V2X operation on the basis of a GNSS timing. Hereinafter, a V2X operation for transmitting synchronization information will be described, but the description of the V2X operation may be identically applied to a V2X direct communication/discovery/monitoring operation.

For example, the target BS may indicate whether the UE needs to transmit synchronization information. That is, the target BS may indicate whether the UE is capable of becoming a synchronization source. To this end, the target BS may set network control synchronization transmission information for an RRC reconfiguration message, and the target BS may indicate the network control synchronization transmission information, which is set for the RRC reconfiguration message, to the UE. When the network control synchronization transmission information is set to an on-value, the on-value indicates that the UE needs to transmit synchronization information. In contrast, an off-value indicates that the UE does not transmit the synchronization information. When the network control synchronization transmission information has been configured, the UE configures a GNSS as a synchronization source according to the priority of GNSS synchronization and BS synchronization, the UE may transmit a synchronization signal on the basis of the GNSS-based synchronization. This configuration may cause the UE to transmit a synchronization signal on the basis of the GNSS-based synchronization even before the completion of a handover. This configuration will be separately described below.

As an example, in a case where a UE capable of performing a V2X operation or capable of transmitting a sidelink synchronization signal transmits a direct discovery announcement, when the UE is located in coverage at a frequency used for a sidelink discovery, or when the UE is located in GNSS coverage, if the UE is in an RRC-CONNECTED state, and if network control synchronization transmission information is configured and is set to an on-value, the UE may transmit a V2X synchronization signal.

As another example, in a case where the UE capable of performing a V2X operation or capable of transmitting a sidelink synchronization signal transmits a direct discovery announcement (or the UE performs V2X direct communication), when the UE is located out of coverage at a frequency used for a sidelink discovery and uses a V2X/sidelink-dedicated frequency, if the UE is located in GNSS coverage, if the UE is in an RRC-CONNECTED state, and if network control synchronization transmission information is configured and is set to an on-value, the UE may transmit a V2X synchronization signal.

As still another example, in a case where the UE capable of performing a V2X operation or capable of transmitting a sidelink synchronization signal transmits a direct discovery announcement (or the UE performs V2X direct communication), when the UE is connected to a cell, which is not a V2X carrier, as a serving cell (PCell) and performs a V2X operation by using a V2X-dedicated carrier, if the UE is located in GNSS coverage, if the UE is in an RRC-CONNECTED state, and if network control synchronization transmission information is configured and is set to an on-value, the UE may transmit a V2X synchronization signal.

As still yet another example, in a case where the UE capable of performing a V2X operation or capable of transmitting a sidelink synchronization signal transmits a direct discovery announcement (or the UE performs V2X direct communication), if the UE is located in GNSS coverage even when the UE is connected to a cell on a V2X carrier as a serving cell (PCell), and if network control synchronization transmission information is configured and is set to an on-value, the UE may transmit a V2X synchronization signal.

As further another example, when a UE that is capable of performing V2X direct communication and is configured to transmit V2X direct communication through a higher layer is in an RRC-CONNECTED state regardless of the existence of data to be transmitted, and when network control synchronization transmission information is configured and is set to an on-value, the UE may transmit a V2X synchronization signal. For example, when the UE is connected to a cell, which is not a V2X carrier, as a serving cell (PCell) and performs a V2X operation by using a V2X-dedicated carrier, the UE may transmit a GNSS synchronization-based V2X synchronization signal. Alternatively, when the UE is located out of coverage on a V2X carrier used for a sidelink discovery, and when the UE performs a V2X operation by using a V2X-dedicated carrier, the UE may transmit a GNSS synchronization-based V2X synchronization signal.

As still further another example, if the UE that is capable of performing V2X direct communication and is configured to transmit V2X direct communication through a higher layer is in an RRC-CONNECTED state regardless of the existence of data to be transmitted, if network control synchronization transmission information is not configured, and if GNSS network control synchronization transmission information is set to an on-value when a Reference Signal Receive Power (RSRP) measurement value of a cell selected in order to transmit a V2X direct communication/discovery announcement is less than an in-coverage synchronization transmission threshold, the UE may transmit a V2X synchronization signal.

The BS may direct the UE to need to transmit GNSS-based synchronization information. That is, the BS may indicate whether the UE is capable of becoming a synchronization source. To this end, the BS may set GNSS-based control synchronization transmission information for an RRC reconfiguration message, and may indicate the GNSS-based control synchronization transmission information, which is set for the RRC reconfiguration message, to the UE. The GNSS-based control synchronization transmission information may represent an information element distinguished from the above-described network control synchronization transmission information. When the GNSS-based control synchronization transmission information is set to an on-value, the on-value indicates that the UE needs to transmit GNSS-based synchronization information. In contrast, an off-value indicates that the UE does not transmit the GNSS-based synchronization information. When the GNSS-based control synchronization transmission information is configured, the UE may transmit a synchronization signal on the basis of the related GNSS-based synchronization.

Information that the source BS delivers to the target BS may include GNSS synchronization-related information. As an example, the information that the source BS delivers to the target BS may include configuration information for directing the UE to use a GNSS as a synchronization source. As another example, the information that the source BS delivers to the target BS may include information for directing the UE to configure synchronization for PC5-based V2X communication among BS-based synchronization and GNSS synchronization. For example, the information that the source BS delivers to the target BS may include information indicating the priority of BS-based synchronization and GNSS-based synchronization. As still another example, the information that the source BS delivers to the target BS may include V2X synchronization configuration information.

The target BS may receive the GNSS, and may include configuration information for directing the UE to use the GNSS as a synchronization source. The GNSS synchronization configuration information may include one or more pieces of information among GNSS synchronization identification information, a GNSS synchronization window, a threshold for using GNSS synchronization, information for indicating a timing offset value that the UE is to actually use as a synchronization source in Universal Time Coordinated (UTC) time information/a timing offset between a BS timing and a GNSS timing/a GNSS synchronization offset/a difference between GNSS-system frame numbers (subframes), information indicating a transmission timing of a GNSS synchronization-based UE which considers a distance between the BS and the UE, location information of the BS, and a CP length and a GNSS synchronization transmission threshold in the case of using GNSS synchronization.

As an example, the BS may transmit GNSS synchronization-related information to the UE periodically/intermittently/by a request of the UE. Through the transmission, although the UE does not directly receive the GNSS, the UE may receive GNSS synchronization-related information from the BS periodically/intermittently/by a request of the UE. Thereby the BS may serve as a synchronization source by using GNSS synchronization on which the UE can rely. The BS may configure indication information for configuring this operation in the UE through an RRC reconfiguration message.

As another example, in a case where a UE capable of performing a V2X operation or capable of transmitting a sidelink synchronization signal transmits a direct discovery announcement, when the UE is located in coverage on a frequency used for a sidelink discovery, or when the UE is located in GNSS coverage, if the UE is in an RRC-CONNECTED state and if GNSS-based control synchronization transmission information is configured and is set to an on-value, the UE may transmit a GNSS-based V2X synchronization signal.

As yet another example, in a case where the UE transmits synchronization information on the basis of a GNSS, although the synchronization information is set to an on-state, when it is possible to receive a GNSS on which the UE can rely, or only when the UE acquires GNSS synchronization on which the UE can rely, the UE may be configured to serve as a synchronization source. To this end, the BS may configure a condition for this configuration.

The BS may direct the UE to be capable of selecting and using one of BS-based synchronization and GNSS synchronization. Alternatively, when the UE is located within a carrier which operates in sidelink-based V2X, the BS may indicate, to the UE, the priority of the BS-based synchronization and the GNSS synchronization. Alternatively, the BS may direct the UE to perform a V2X operation on the basis of GNSS-based synchronization.

The BS may indicate a GNSS synchronization transmission threshold to the UE. The GNSS synchronization transmission threshold indicates a threshold used while being located in an area which enables GNSS reception. When a GNSS measurement value (an optional GNSS reception state measurement value, such as GNSS received signal intensity/quality/strength/interference, etc., and for convenience description, hereinafter, expressed as a "GNSS measurement value") is better than a GNSS synchronization transmission threshold (e.g., is greater than or equal to the threshold), the UE may transmit a V2X synchronization signal/sidelink synchronization signal according to the indication information from the BS. The BS may configure indication information for this configuration, in the UE.

As an example, when a UE capable of performing a V2X operation or capable of transmitting a sidelink synchronization signal transmits a direct discovery announcement, if network control synchronization transmission information is not configured, if the UE receives GNSS synchronization request indication information from another UE or receives GNSS synchronization transmission indication information from the BS, and if a GNSS reception state measurement value is better than a GNSS synchronization transmission threshold, the UE may transmit a GNSS-based V2X synchronization signal.

As another example, when a UE that is capable of performing V2X direct communication and is configured to transmit V2X direct communication through a higher layer is in an RRC-CONNECTED state regardless of the existence of data to be transmitted, if network control synchronization transmission information is not configured, if the UE receives GNSS synchronization request indication information from another UE or receives GNSS synchronization transmission indication information from the BS, and if a GNSS reception state measurement value is better than a GNSS synchronization transmission threshold, the UE may transmit a GNSS-based V2X synchronization signal.

As another example, when a GNSS measurement value is not better than a GNSS synchronization transmission threshold, the UE may transmit a V2X synchronization signal by using an in-coverage synchronization transmission threshold indicated by the BS. The in-coverage synchronization transmission threshold indicates a threshold used while being located in V2X coverage. When an RSRP measurement value of a cell, which is selected in order to transmit a V2X direct communication/discovery announcement, is greater than the in-coverage synchronization transmission threshold, the UE may transmit a BS synchronization-based V2X synchronization signal/sidelink synchronization signal.

As another example, when the RSRP measurement value of the cell, which is selected in order to transmit a V2X direct communication/discovery announcement, is less than the in-coverage synchronization transmission threshold, if a GNSS measurement value is better than a GNSS synchronization transmission threshold, the UE may transmit a GNSS-based V2X synchronization signal/sidelink synchronization signal.

As another example, when a UE capable of performing a V2X operation or capable of transmitting a sidelink synchronization signal transmits a direct discovery announcement, if network control synchronization transmission information is configured and is set to an on-value, and if a GNSS measurement value is better than a GNSS synchronization transmission threshold, the UE may transmit a GNSS-based V2X synchronization signal.

As another example, in a case where the UE capable of performing a V2X operation or capable of transmitting a sidelink synchronization signal transmits a direct discovery announcement, when the UE is located in coverage at a frequency used for a sidelink discovery, or when a GNSS measurement value is better than a GNSS synchronization transmission threshold, if the UE is in an RRC-CONNECTED state, and if network control synchronization transmission information is configured and is set to an on-value, the UE may transmit a GNSS-based V2X synchronization signal.

When the BS indicates a GNSS synchronization transmission threshold to the UE, the BS may configure additional information for preventing the selection of GNSS synchronization. For example, the additional information may have one or more values among a minimum hysteresis or a maximum hysteresis, a scaling factor, and duration/time.

Even when GNSS reception quality is lower than a predetermined threshold and the UE has difficulty in receiving a GNSS, the UE may autonomously maintain GNSS synchronization during a predetermined time period, and the UE may perform a V2X operation on the basis of the GNSS synchronization. Even when the UE has temporary difficulty in receiving a GNSS, although the GNSS reception quality is lower than the predetermined threshold, the UE may operate a timer for maintaining the GNSS reception quality in order to prevent immediate synchronization switching. The timer may be previously configured or may be indicated by the BS. When the GNSS reception quality exceeds the threshold and the UE achieves the GNSS synchronization while the timer operates, the UE may stop or restart the timer.

GNSS Status Information of UE

In the typical LTE technology, synchronization is performed according to BS synchronization or a previously-configured timing, it is unnecessary to deliver sidelink synchronization configuration information to a target cell. However, when the UE performs a V2X operation by using GNSS synchronization configuration information, the target BS may indicate synchronization configuration information of the UE, that has been handed over, by using the GNSS synchronization configuration information. However, when the UE is configured to perform a V2X operation (or a PC5-based V2X operation that the UE performs through GNSS synchronization according to the indication by the BS) on the basis of a synchronization source timing indicated by the BS, the UE may not succeed in configuring synchronization through a GNSS. For example, for an optional reason, such as a case where a user manually disables GPS hardware, a case where the GPS hardware does not operate, or low GNSS quality (a case of being located out of GNSS coverage during a predetermined time period), or the like, the UE may not achieve the GNSS synchronization.

As described above, when the source BS receives, from the UE, and knows status information of the UE, the source BS may transmit the status information to the target BS. Thereby, the target BS may minimize the interruption of a V2X service after a handover, or the target BS may refer to the status information in configuring information in order to indicate GNSS-based synchronization configuration. The target BS may indicate configuration information on V2X synchronization source configuration of the target BS or V2X synchronization information transmission thereof on the basis of the information received from the source BS.

The UE may notify an E-UTRAN of a GNSS status in order to perform V2X communication conducted through (GNSS-based) PC5. As an example, when the UE is interested in V2X transmission/reception (using GNSS-based sidelink), when the UE is no longer interested in the V2X transmission/reception, when a GNSS receivable status is changed, when a GNSS radio reception status becomes better than a particular threshold indicated by the BS, when the GNSS radio reception status becomes worse than the particular threshold indicated by the BS, or in order to report GNSS reception information/GNSS reception-related information to the BS by a request of the BS, the RRC-CONNECTED UE (or the UE for which V2X is configured) may start a GNSS status reporting procedure.

As an example, the UE may set the contents of a message (for convenience of description, hereinafter, expressed as a "GNSS status report message") to be delivered to the BS as follows. For example, the UE sets a GNSS receivable status for a GNSS receivable status parameter. For example, the UE sets a GNSS reception measurement value for a GNSS measurement parameter. For example, the UE includes GNSS reception information a GNSS status report message.

The UE submits a GNSS status report message to a lower layer in order to transmit the GNSS status report message.

When the UE is not capable of receiving a GNSS, the UE may report the GNSS non-receivable state to the BS.

As an example of this configuration, when a GNSS reception measurement value (one or more values among GNSS received signal power, GNSS received signal strength, GNSS received signal quality, GNSS received SNR, UE GNSS timing of cell frame, and UE GNSS code measurements, or optional measurement value for determining GNSS receivable status) is poor (e.g., when the GNSS reception measurement value is less than a threshold configured by the BS), the UE may start a timer (configured by the BS) (hereinafter, for convenience of description, expressed as a "start timer").

When the timer expires, the UE may set a GNSS receivable status parameter to a non-receivable status, and the UE may transmit a GNSS status report message to the BS.

When the GNSS reception measurement value becomes better (when exceeding the above-described threshold, or when exceeding the above-described threshold during a predetermined time period designated by the BS) in a state where the above-described start timer is operating, the UE may stop the above-described start timer.

As another example, the UE may perform the above-described GNSS status reporting through a sidelink UE information message.

The UE may start a sidelink UE information message in order to report a parameter for a GNSS-based sidelink operation.

When the UE is configured to report a parameter for a GNSS-based sidelink operation (e.g., GNSS synchronization-based PC5 V2X communication/discovery/synchronization resource configuration/service) (and/or when the UE supports a GNSS-based sidelink operation), the UE may start a sidelink UE information message.

As another example, the UE may perform the above-described GNSS status reporting through a UE information message (or an optional UL RRC message).

The UE may start a sidelink UE information message in order to report a parameter for a GNSS-based sidelink operation.

When the UE is configured to report a parameter for a GNSS-based sidelink operation (e.g., GNSS synchronization-based PC5 V2X communication/discovery/synchronization resource configuration/service) (and/or when the UE supports a GNSS-based sidelink operation), the UE may start a UE information message.

The target BS may indicate whether the UE needs to transmit synchronization information. That is, the target BS may indicate whether the UE is capable of becoming a synchronization source. To this end, the BS may set network control synchronization transmission information for an RRC reconfiguration message, and the BS may indicate the network control synchronization transmission information, which is set for the RRC reconfiguration message, to the UE. When the network control synchronization transmission information is set to an on-value, the on-value indicates that the UE needs to transmit synchronization information. In contrast, an off-value indicates that the UE does not transmit the synchronization information. When the network control synchronization transmission information is configured, the UE may transmit a synchronization signal on the basis of the related BS synchronization (PSS/SSS).

As an example, in a case where a UE capable of performing a V2X operation or capable of transmitting a sidelink synchronization signal transmits a direct discovery announcement, when the UE is located in coverage at a frequency used for a sidelink discovery, or when the UE is located in GNSS coverage, if the UE is in an RRC-CONNECTED state, and if network control synchronization transmission information is configured and is set to an on-value, the UE may transmit a V2X synchronization signal.

When the BS directs the UE to perform a V2X operation by using GNSS synchronization (or when the BS directs the UE to prioritize GNSS synchronization over BS synchronization and to perform a V2X operation), the UE may transmit a GNSS synchronization-based V2X synchronization signal.

As an example, when the UE is not capable of achieving GNSS synchronization for one of the above-described reasons or for the above-described optional reasons, the UE may stop/suspend the transmission of a GNSS synchronization-based V2X synchronization signal.

As another example, when the UE is not capable of achieving GNSS synchronization for one of the above-described reasons or for the above-described optional reasons, the UE may transmit a BS synchronization-based V2X synchronization signal.

As still another example, when the UE is not capable of achieving GNSS synchronization for one of the above-described reasons or for the above-described optional reasons, the UE may transmit a BS synchronization-based V2X synchronization signal according to the indication of the BS. The BS may configure indication information for this configuration, in the UE.

When a UE that is capable of performing V2X direct communication and is configured to transmit V2X direct communication through a higher layer is in an RRC-CONNECTED state regardless of the existence of data to be transmitted, and when network control synchronization transmission information is configured and is set to an on-value, the UE may transmit a V2X synchronization signal.

As an example, when the UE is not capable of achieving GNSS synchronization for one of the above-described reasons or for the above-described optional reasons, the UE may stop/suspend the transmission of a GNSS synchronization-based V2X synchronization signal.

As another example, when the UE is not capable of achieving GNSS synchronization for one of the above-described reasons or for the above-described optional reasons, the UE may transmit a BS synchronization-based V2X synchronization signal.

As still another example, when the UE is not capable of achieving GNSS synchronization for one of the above-described reasons or for the above-described optional reasons, the UE may transmit a BS synchronization-based V2X synchronization signal according to the indication of the BS. The BS may configure indication information for this configuration, in the UE.

If the UE that is capable of performing V2X direct communication and is configured to transmit V2X direct communication through a higher layer is in an RRC-CONNECTED state regardless of the existence of data to be transmitted, if network control synchronization transmission information is not configured, and if GNSS-based synchronization transmission is indicated when a Reference Signal Receive Power (RSRP) measurement value of a cell selected in order to transmit a V2X direct communication/discovery announcement is less than an in-coverage synchronization transmission threshold, the UE may transmit a V2X synchronization signal.

As an example, when the UE is not capable of achieving GNSS synchronization for one of the above-described reasons or for the above-described optional reasons, the UE may stop/suspend the transmission of a GNSS synchronization-based V2X synchronization signal.

As another example, when the UE is not capable of achieving GNSS synchronization for one of the above-described reasons or for the above-described optional reasons, the UE may transmit a BS synchronization-based V2X synchronization signal.

As still another example, when the UE is not capable of achieving GNSS synchronization for one of the above-described reasons or for the above-described optional reasons, the UE may transmit a BS synchronization-based V2X synchronization signal according to the indication of the BS. The BS may configure indication information for this configuration for the UE.

GNSS-Related UE Capability Information

The UE may transmit a UE capability message including GNSS capability information to the BS (or a core network or the BS through the core network).

A UE capability transmission procedure using RRC is for transmitting UE radio access capability information from the UE to the BS.

When the BS requires (additional) UE radio access capability information, the BS starts the procedure with respect to an RRC-CONNECTED UE.

The UE, that has received a UE capability enquiry message from the BS, may transmit, to the BS, a UE capability information message including UE capability information.

The BS may perform configuration so as to use a GNSS in UE as a synchronization source, by using UE capability information indicating that a GNSS is capable of being used as a synchronization source.

As an example of the UE capability information indicating that a GNSS is capable of being used as a synchronization source, the UE may use a parameter (stand-aloneGNSS-Location) indicating whether a GNSS receiver is included that is capable of being used to provide detailed location information in an RRC measurement report and in measurement logged in an RRC_IDLE state. For example, the BS may determine whether the UE is configured to use a GNSS as a synchronization source, on the basis of parameter information.

As another example, a new parameter, which is distinguished from the above-described parameter, may be defined. The new parameter may represent that a synchronization source is capable of being configured. The UE performs PC5-based V2X communication/service by using a GNSS as a synchronization source. Such UE operation is a different function from the typical location information provision. Accordingly, a new parameter for this function may be defined and configured. The BS may determine whether the UE is configured to use a GNSS as a synchronization source, on the basis of this information.

As another example, the source BS may transmit GNSS-related capability information of the UE to the target BS. The target BS may indicate configuration information on V2X synchronization source configuration of the target BS or V2X synchronization information transmission thereof on the basis of the information received from the source BS.

The UE, that has received, from the target BS, the indication information which causes a GNSS to be configured to be used as a synchronization source, may perform a V2X operation by using the GNSS as a synchronization source.

As an example, when the selected synchronization reference UE (SyncRefUE) uses a GNSS as a synchronization source, the UE may perform monitoring according to a timing of the synchronization reference UE. Alternatively, when the UE does not have the selected synchronization reference UE, the UE may perform monitoring on the basis of a GNSS reception-based autonomous timing of the UE.

Alternatively, the UE may perform monitoring on the basis of a GNSS synchronization timing configured according to the indication of the BS.

As another example, when the selected synchronization reference UE (SyncRefUE) uses a GNSS as a synchronization source, the UE may transmit V2X control information and the relevant data according to a timing of the synchronization reference UE. Alternatively, when the UE does not have the selected synchronization reference UE, the UE may transmit V2X control information and the relevant data on the basis of a GNSS reception-based autonomous timing of the UE. Alternatively, the UE may transmit V2X control information and the relevant data on the basis of a GNSS synchronization timing configured by the indication of the BS.

As an example, when the UE is not capable of achieving GNSS synchronization for one of the above-described reasons or for the above-described optional reasons, the UE may stop/suspend the transmission of V2X control information and the relevant data or the V2X monitoring which are based on a GNSS synchronization-based autonomous timing.

As another example, when the UE is not capable of achieving GNSS synchronization for one of the above-described reasons or for the above-described optional reasons, the UE may transmit V2X control information and the relevant data or perform V2X monitoring which are based on a BS synchronization-based autonomous timing.

As still another example, when the UE is not capable of achieving GNSS synchronization for one of the above-described reasons or for the above-described optional reasons, the UE may transmit V2X control information and the relevant data or perform V2X monitoring, which are based on an autonomous timing according to the indication of the BS. The BS may configure indication information for this configuration, in the UE.

As yet another example, the UE may transmit V2X control information and the relevant data or perform V2X monitoring which are based on a previously-configured autonomous timing. The BS may configure, in the UE, indication information for this configuration or the indication information may be previously configured in the UE.

The handover preparation information may further include at least one piece of information among assistance information for determining and indicating an SPS configuration, assistance information on an SPS interval, and configuration information for indicating cross-carrier scheduling as the need arises as well as the above-described pieces of information.

The target BS may configure resource configuration information for preventing the interruption and delay of data in a handover process of the UE by using the above-described handover preparation information, and the target BS may deliver the resource configuration information to the UE through the source BS.

Hereinafter, a description will be made of an operation of the UE in a case where the source BS includes the resource configuration information, which has been configured by the target BS, in handover command information, and transmits, to the UE, the handover command information including the resource configuration information.

Operation of the UE that has Received Handover Command Information

Hereinafter, an operation of the UE that has received a handover command will be described.

The UE, that has received an RRC connection reconfiguration message which indicates a handover or includes mobility control information (Mobilitycontrolinfo), or the UE, that has received an RRC connection reconfiguration message, performs a UE operation by using information included in the RRC connection reconfiguration message, and transmits an RRC connection reconfiguration completion message, may perform the following operation.

The UE sets a timer value of a timer T304 to "t304" included in mobility control information, and the UE starts the timer T304.

As an example, when the handover command information includes indication information indicating the configuration of synchronization for PC5-based V2X communication on the basis of GNSS synchronization, the UE may start GNSS-based synchronization. Alternatively, when the handover command information includes information indicating that GNSS synchronization has a priority or includes GNSS synchronization configuration information, the UE may acquire synchronization-related information from a GNSS and may start GNSS-based synchronization.

As another example, when the handover command information includes indication information indicating the configuration of synchronization for PC5-based V2X communication on the basis of GNSS synchronization, includes information indicating that GNSS synchronization has a priority, or includes GNSS synchronization configuration information, if the UE receives GNSS synchronization information, the UE may start GNSS synchronization without requiring the acquisition of synchronization-related information from a GNSS.

As still another example, when the handover command information includes optional information, the UE may acquire GNSS synchronization-related information of a target PCell and may start synchronization with a GNSS. As the need arises, the UE may acquire synchronization-related information from a GNSS, and may start synchronization with the GNSS.

As yet another example, when the UE receives GNSS synchronization-related system information broadcasted by the target PCell, the UE may transmit, to the BS, a V2X UE information message including a GNSS status information message during the last 1 second preceding reception of an RRC reconfiguration message (RRCConnectionReconfiguration message) including mobility control information (mobilityControlInfo).

The UE may perform a V2X operation on the basis of GNSS synchronization until the UE completes the handover.

As an example, before the UE performs a random access procedure with respect to a target cell, until the UE receives an RRC reconfiguration message and transmits a random access preamble, while the UE performs the random access procedure, until the UE receives a random access response message, before the UE completes the random access procedure, until the UE transmits an RRC reconfiguration completion message, when the UE directly receives a reliable GNSS, when the UE receives GNSS synchronization-related information from the BS, or when the UE receives, from the BS, information indicating the transmission of synchronization information on the basis of a GNSS, the UE may use the GNSS as a synchronization source. That is, when the above-described conditions are satisfied, the UE may transmit synchronization information on the basis of a GNSS or may perform a GNSS-based V2X operation.

As another example, when the handover command information includes indication information indicating the configuration of synchronization for PC5-based V2X on the basis of GNSS synchronization, when the handover command information includes information indicating that GNSS synchronization has a priority, or when the handover command information includes GNSS synchronization configuration information, before the UE performs a random access procedure with respect to the target cell, or until the UE receives an RRC reconfiguration message and transmits a random access preamble, or while the UE performs the random access procedure, or until the UE receives a random access response message, or before the UE completes the random access procedure, or until the UE transmits an RRC reconfiguration completion message, or when the UE directly receives a reliable GNSS, or when the UE receives GNSS synchronization-related information from the BS, the UE may use the GNSS as a synchronization source. That is, when the above-described conditions are satisfied, the UE may transmit synchronization information on the basis of the GNSS or may perform a GNSS-based V2X operation.

As still another example, while the UE receives an RRC reconfiguration message including mobility control information and the relevant timer (e.g., T304) operates, the UE may perform a V2X operation by using resource allocation information (e.g., resource configuration information of FIGS. 5 and 6) for minimizing a temporary interruption while the UE is handed over. To this end, the UE may receive resource allocation information for minimizing a temporary interruption while the UE is handed over by the source BS.

As an example, the resource allocation information may be communication transmission exception pool information in the conventional Release 12 sidelink direct communication technology. Communication transmission exception pool used in the sidelink direct communication technology may represent pool information used until the reception of an RRC connection reconfiguration message including a sidelink communication configuration in a physical layer problem, radio link failure, or RRC connection establishment, or until the reception of RRC connection release or RRC connection rejection.

As another example, the resource allocation information may be new communication transmission pool information which is distinguished from the communication transmission exception pool in the typical Release 12 sidelink direct communication technology. The communication transmission exception pool used in the sidelink direct communication technology causes communication to be performed on the basis of a timing depending on a previously-configured pool. However, in the case (e.g., V2X operation) of being based on GNSS synchronization, it is possible to newly configure a communication transmission pool for this configuration on the basis of GNSS synchronization and to indicate the newly-configured communication transmission pool. Specifically, when the UE is in an RRC-CONNECTED state and uses a PCell for V2X communication, the UE is configured to perform transmission by using a resource pool indicated by the current PCell in which a physical layer problem or radio link failure is detected. Alternatively, when the UE is in an RRC-CONNECTED state and communication transmission resources are configured to be set according to scheduling by the BS through a PCell, if a timer, that starts when the PCell detects a physical layer problem or that starts when an RRC reconfiguration procedure is initiated, is operating and the PCell or the BS (the source BS or target BS), that detects a physical layer problem or radio link failure of the UE, broadcasts system information including a GNSS-based V2X communication transmission exception pool, the UE is configured to transmit sidelink control information and the relevant data by using a resource pool indicated by a first entry (or the GNSS-based V2X communication transmission exception pool) of the GNSS-based V2X communication transmission exception pool through a lower layer. Alternatively, when the UE receives an RRC reconfiguration message including mobility control information and when the timer T304 is operating and the PCell, the source BS, or the target BS broadcasts system information including a GNSS-based V2X communication transmission exception pool, the UE is configured to transmit sidelink control information and the relevant data by using a resource pool indicated by a first entry (or a GNSS-based V2X/sidelink communication transmission exception pool) of the GNSS-based V2X communication transmission exception pool through a lower layer.

As described above, in accordance with embodiments of the present disclosure, a V2X operation can be performed while the delay or interruption of the transmission/reception of data is reduced during a process in which a handover is performed according to the movement of the UE when the RRC-CONNECTED UE in the typical LTE technology desires to perform direct communication for a V2X service.

Hereinafter, configurations of the UE and the BS capable of performing some or all of the above-described embodiments of the present disclosure will be again described with reference to the accompanying drawings.

Figure 7:
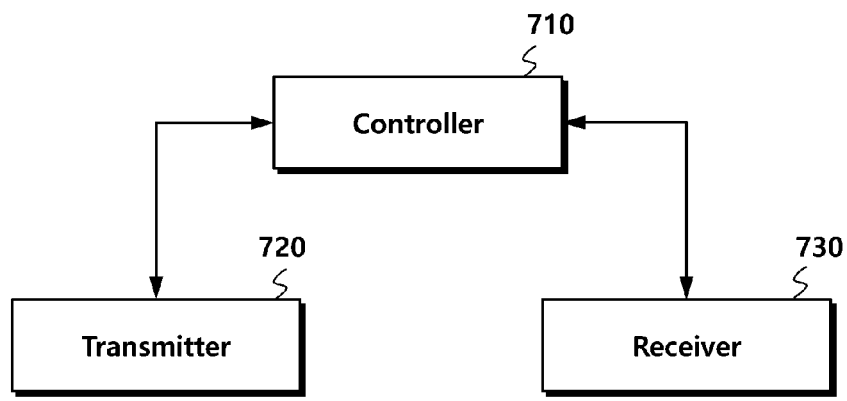
FIG. 7 is a block diagram illustrating a configuration of a user equipment according to an embodiment of the present disclosure.

FIG. 7 is a block diagram illustrating a configuration of a UE according to an embodiment.

Referring to FIG. 7, the UE 700 performs V2X communication. The UE 700 may include a controller 710, a transmitter 720, and a receiver 730. The controller 170 configures synchronization for V2X communication by using synchronization type information for V2X received from a source BS. The receiver 730 receives, from the source BS, handover command information including resource configuration information for V2X configured by a target BS. Also, the controller 710 may perform V2X communication by using the resource configuration information until the UE 700 completes a handover to the target BS.

The receiver 730 may receive synchronization type information for V2X communication from the source BS. The synchronization type information may include information on whether synchronization to be used to perform V2X communication by the UE is based on the BS, information on whether the synchronization is based on a GNSS, or information indicating the priority of the BS-based synchronization and the GNSS-based synchronization.

Also, the receiver 730 may receive measurement configuration information, which is used for the measurement of cell quality and the like, from the BS (i.e., the source BS in a handover procedure) that is configuring an RRC connection.

When the resource configuration information includes synchronization configuration information indicating synchronization configuration for V2X of the UE until the completion of the handover, the controller 710 may configure the synchronization of the UE by using the synchronization configuration information until the completion of the handover. The resource configuration information may be included in handover command information, and the handover command information may be included in mobility control information. Meanwhile, the resource configuration information may be configured on the basis of handover preparation information that the source BS transmits to the target BS, and the handover preparation information may include at least one piece of information among V2X configuration information configured by the source BS, GNSS status information of the UE, and UE capability information of the UE. For example, the V2X configuration information may include the above-described synchronization type information configured in the UE by the source BS.

In addition, the controller 710 controls an overall operation of the UE 700 for maintaining V2X communication by using the resource configuration information configured by the target BS in a handover process by the UE that performs V2X communication according to the above-described embodiments.

The receiver 730 may receive DL control information, data, and a message from the BS through a relevant channel. The receiver 730 may receive data and control information from another UE. Also, the transmitter 720 may transmit UL control information, data, and a message to the BS through a relevant channel. The transmitter 720 may transmit data and control information to another UE.

Figure 8:
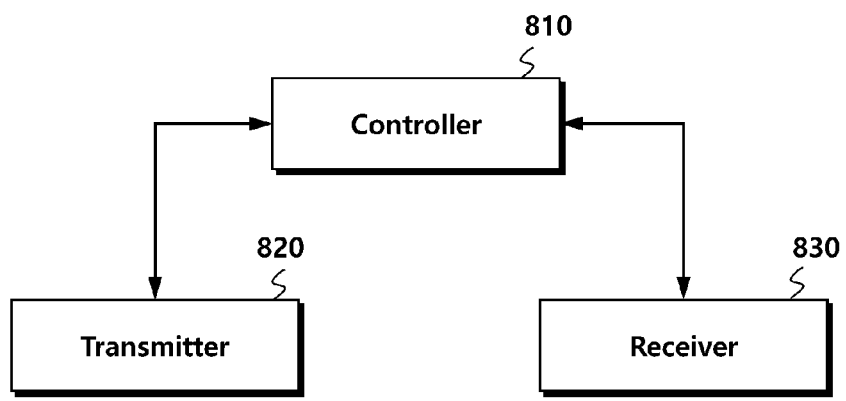
FIG. 8 is a block diagram illustrating a configuration of a source base station according to an embodiment of the present disclosure.

FIG. 8 is a block diagram illustrating a configuration of a source BS according to an embodiment.

Referring to FIG. 8, the source BS 800 controls a handover of a UE that performs V2X communication. The source BS 800 may include a controller 810, a transmitter, and a receiver 830. that the controller 810 determines the handover of the UE that is performing V2X. The transmitter 820 transmits, to a target BS, handover preparation information including at least one piece of information among V2X configuration information configured by the source BS, GNSS status information of the UE, and UE capability information of the UE. The receiver 830 receives resource configuration information for V2X of the UE from the target BS. The transmitter 820 may transmit handover command information including the resource configuration information to the UE.

As described above, the V2X configuration information may include synchronization type information configured in the UE, and the synchronization type information may include information indicating whether the UE is in a BS-based synchronization type or whether the UE is in a GNSS-based synchronization type.

Also, the transmitter 820 may transmit RRC connection reconfiguration message including handover command information to the UE, and the handover command information may be included in mobility control information. The resource configuration information may include information indicating V2X radio resources that the UE is to use until the completion of the handover of the UE. Alternatively, the resource configuration information may include synchronization configuration information the UE is to configure until the completion of the handover of the UE. That is, the V2X configuration information includes information indicating synchronization of a type that the UE configures or uses.

In addition, the controller 810 controls an overall operation of the BS 800 for delivering V2X resource configuration information of the target BS from the source BS to the UE in order to prevent the interruption or delay of the transmission/reception of data in a handover process of the UE that is performing V2X communication according to the above-described embodiments.

Also, the transmitter 820 and the receiver 830 serve to transmit and receive signals, messages, or data, according to the above-described embodiments, to/from the UE or the target BS.

The boilerplate contents or boilerplate documents described in the above-described embodiments of the present invention are omitted in order to briefly describe the specification, and form a part of this specification. Accordingly, the addition of the partial contents of the above boilerplate contents or boilerplate documents to this specification, or the description of the partial contents of the above boilerplate contents or boilerplate documents in claims should be construed as corresponding to the scope of the present disclosure.

The above description is only an illustrative description of the technical idea of the present disclosure, and those having ordinary knowledge in the technical field, to which the present disclosure pertains, will appreciate that various changes and modifications may be made to the embodiments described herein without departing from the essential features of the present disclosure. Therefore, the embodiments disclosed in the present disclosure are intended not to limit but to describe the technical idea of the present disclosure, and thus do not limit the scope of the technical idea of the present disclosure. The protection scope of the present disclosure should be construed based on the appended claims, and all of the technical ideas included within the scope equivalent to the appended claims should be construed as being included within the right scope of the present disclosure.

What is claimed is:

1. A handover method of a user equipment for performing Vehicle To Everything (V2X) communication, the handover method comprising:
   receiving, by the user equipment, synchronization type information for the V2X communication from a source base station, and configuring a synchronization type;
   receiving, by the user equipment from the source base station, handover command information including resource configuration information for the V2X communication which is configured by a target base station; and
   performing the V2X communication until completion of a handover to the target base station by using the resource configuration information,
   wherein the resource configuration information includes synchronization configuration information indicating a synchronization configuration to be configured by the user equipment for the V2X communication; and
   wherein the resource configuration information including the synchronization configuration information is configured by the target base station based on handover preparation information transmitted by the source base station to the target base station, where the handover preparation information includes the synchronization type information configured in the user equipment by the source base station.

2. The handover method as claimed in claim 1, wherein the performing of the V2X communication comprises configuring synchronization of the user equipment by using the synchronization configuration information until the completion of the handover.

3. The handover method as claimed in claim 1, wherein the handover preparation information further comprises at least one piece of information among V2X configuration information configured by the source base station, Global Navigation Satellite System (GNSS) status information of the user equipment, and user equipment capability information.

4. The handover method as claimed in claim 1, wherein the resource configuration information configured by the target base station is transmitted by the target base station to the source base station.

5. A method for controlling a handover of a user equipment for performing Vehicle To Everything (V2X) communication by a source base station, the method comprising:
   determining the handover of the user equipment that is performing the V2X communication;
   transmitting, by the source base station to a target base station, handover preparation information comprising at least one piece of information among V2X configuration information configured by a source base station, Global Navigation Satellite System (GNSS) status information of the user equipment, and user equipment capability information, wherein the V2X configuration information includes synchronization type information configured in the user equipment;
   receiving, by the source base station from the target base station, resource configuration information configured by the target base station for the V2X communication of the user equipment; and
   transmitting, by the source base station, handover command information including the resource configuration information to the user equipment,
   wherein the resource configuration information includes synchronization configuration information indicating a synchronization configuration that the user equipment is to configure until completion of the handover of the user equipment; and
   wherein the resource configuration information including the synchronization configuration information is configured by the target base station based on the synchronization type information included in the handover preparation information transmitted by the source base station to the target base station.

6. The method as claimed in claim 4, wherein the synchronization type information comprises information indicating whether the user equipment is in a base station-based synchronization type or whether the user equipment is in a GNSS-based synchronization type.

7. The method as claimed in claim 4, wherein the resource configuration information further comprises information indicating V2X radio resources that the user equipment is to use until the completion of the handover of the user equipment.

8. A user equipment for performing Vehicle To Everything (V2X) communication, the user equipment comprising:
   a controller configured to receive synchronization type information for the V2X from a source base station, and to configure a synchronization type; and
   a receiver configured to receive, from the source base station, handover command information including resource configuration information for the V2X communication which is configured by a target base station,
   wherein the controller performs the V2X communication until completion of a handover to the target base station by using the resource configuration information;
   wherein the resource configuration information includes synchronization configuration information indicating a synchronization configuration to be configured by the user equipment for the V2X communication; and
   wherein the resource configuration information including synchronization configuration information is configured by the target base station based on handover preparation information transmitted by the source base station to the target base station, where the handover preparation information includes the synchronization type information configured in the user equipment by the source base station.

9. The user equipment as claimed in claim 8, wherein the controller configures synchronization of the user equipment by using the synchronization configuration information until the completion of the handover.

10. The user equipment as claimed in claim 8, wherein the handover preparation information further comprises at least one piece of information among V2X configuration information configured by the source base station, Global Navigation Satellite System (GNSS) status information of the user equipment, and user equipment capability information.

11. The user equipment as claimed in claim 8, wherein the resource configuration information configured by the target base station is transmitted by the target base station to the source base station.

* * * * *

UNITED STATES PATENT AND TRADEMARK OFFICE
CERTIFICATE OF CORRECTION

PATENT NO. : 10,299,180 B2
APPLICATION NO. : 15/411926
DATED : May 21, 2019
INVENTOR(S) : Sung-pyo Hong et al.

It is certified that error appears in the above-identified patent and that said Letters Patent is hereby corrected as shown below:

In the Claims

In Claim 6, Column 30, Line 30, "The method as claimed in claim 4" should be amended to --The method as claimed in claim 5--;

In Claim 7, Column 30, Line 35, "The method as claimed in claim 4" should be amended to --The method as claimed in claim 5--.

Signed and Sealed this
Thirtieth Day of July, 2019

Andrei Iancu
*Director of the United States Patent and Trademark Office*